(12) United States Patent
Saito

(10) Patent No.: US 6,980,291 B2
(45) Date of Patent: Dec. 27, 2005

(54) METHOD OF AND APPARATUS FOR INSPECTING A CURVED SHAPE

(75) Inventor: Isao Saito, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/804,141

(22) Filed: Mar. 19, 2004

(65) Prior Publication Data

US 2004/0174540 A1    Sep. 9, 2004

Related U.S. Application Data

(63) Continuation of application No. PCT/JP03/09744, filed on Jul. 31, 2003.

(30) Foreign Application Priority Data

Aug. 1, 2002    (JP)    ............... 2002-224858

(51) Int. Cl.$^7$ ........................................... G01N 00/21
(52) U.S. Cl. ................................................. 356/237.2
(58) Field of Search ................................ 356/445–448, 356/237.1–237.2, 601, 602, 239.1–239.3

(56) References Cited

U.S. PATENT DOCUMENTS

| | | | |
|---|---|---|---|
| 4,792,232 A * | 12/1988 | Jobe et al. .................. 356/394 |
| 4,948,258 A | 8/1990 | Caimi | |
| 5,557,410 A | 9/1996 | Huber et al. | |
| 6,100,990 A * | 8/2000 | Ladewski ................... 356/445 |
| 6,441,888 B1 * | 8/2002 | Azuma et al. ............. 356/4.01 |
| 6,549,289 B1 * | 4/2003 | Ellis ............................ 256/603 |
| 6,618,123 B2 * | 9/2003 | Uomori et al. ............ 356/3.12 |
| 2004/0057046 A1 * | 3/2004 | Abbott et al. ............ 356/239.1 |

FOREIGN PATENT DOCUMENTS

| | | |
|---|---|---|
| JP | 60-200141 | 10/1985 |
| JP | 3-44504 | 2/1991 |
| JP | 4-148814 | 5/1992 |
| JP | 5-87521 | 4/1993 |
| JP | 7-26833 | 3/1995 |
| JP | 8-114430 | 5/1996 |
| JP | 9-210653 | 8/1997 |
| JP | 11-148813 | 6/1999 |
| JP | 11-304723 | 11/1999 |
| JP | 2002-202113 | 7/2002 |

* cited by examiner

*Primary Examiner*—Michael P. Stafira
(74) *Attorney, Agent, or Firm*—Oblon, Spivak, McClelland, Maier & Neustadt, P.C.

(57) ABSTRACT

It is an object of the present invention to make it possible to use the same inspection apparatus regardless of the difference of the model of the glass sheets.

The present invention comprises a step of irradiating a surface of a glass sheet G with light from a patterned light source $2a$ having a specific pattern, a step of picking up an image of the glass sheet G, a step of analyzing the image to extract a reflected image of the light source $2a$, and a step of performing a good/defective judgment of the shape of the glass sheet G based on the result of comparing data regarding to the extracted reflected image with data regarding to the reflected image by a good product which is registered in advance.

18 Claims, 7 Drawing Sheets

METHOD OF AND APPARATUS FOR INSPECTING A CURVED SHAPE

CROSS REFERENCE TO RELATED APPLICATION

This is a Continuation Application of PCT Application No. PCT/JP03/09744, filed on Jul. 31, 2003, which was not published under PCT Article 21(2) in English. This application is based upon and claims the benefit of priority from the prior Japanese Patent Application No. 2002-224858, filed Aug. 1, 2002, the entire contents of which are incorporated herein by reference.

TECHNICAL FIELD

The present invention relates to a method of and an apparatus for inspecting a curved shape, in particular to a method of and apparatus for inspecting the shape of a curved glass sheet to be employed as a window glass for automobiles.

BACKGROUND ART

In recent years, many types of curved glass sheets have been employed as windowpanes for automobiles. Such curved glass sheets are each produced by cutting a flat plate-shaped glass sheet produced by e.g. a float process to have a desired shape and size, heating the glass sheet up to the softening point (about 650° C.) and e.g. a press-molding it into a desired curved shape. Then, the glass sheet molded to be curved is brought to a shape inspection as follows.

FIG. 9 shows a conventional shape inspection apparatus for curved glass sheets. As shown in the figure, an inspection apparatus 100 comprises an inspection plane 101 on which a glass sheet G is placed and which is shaped to have a curved shape corresponding to the shape of the glass sheet G to be inspected, in advance. In the inspection plane 101, a plurality of displacement sensors 102 are embedded. Therefore, when a glass sheet G is placed on the inspection plane 101, the distances (displacement amounts) from the inspection plane 101 to the bottom surface of the glass sheet G are measured by the displacement sensors 102, and the measurement results are read out by a controller 200. As a result, the controller 200 judges that the glass sheet is a good product if the displacement amounts are within a predetermined range (for example, within ±0.5 mm), and judges that it is a defective product if the displacement amounts are not within the range.

Thus, in the conventional inspection apparatus 100 shown in FIG. 9, the shape of the inspection plane 101 needs to be newly prepared according to the model of glass sheet G, and the plurality of displacement sensors 102 need to be newly embedded according to e.g. the shape of glass sheet G. Therefore, a dedicated inspection apparatus 100 needs to be prepared for every model of glass sheet G, and there has been a problem that the cost for the inspection is increased. Since a plurality of curved glass sheets such as a windshield, a rear glass, a door glass, a front bench, and a rear quarter are employed for each automobile, it is necessary to prepare a dedicated inspection apparatus 100 for each of them. Further, since it is necessary to prepare the set of inspection apparatuses 100 for each automobile model, a huge number of inspection apparatuses 100 become necessary.

It is an object of the present invention to resolve the above-mentioned problems, and to provide a method of and an apparatus for inspecting a curved shape whereby the same inspection apparatus can be used regardless of the difference of the model of the glass sheet, and the inspection can be performed more easily than the conventional methods and apparatuses.

DISCLOSURE OF THE INVENTION

The present invention provides a method of inspecting a curved shape, comprising:
a step of irradiating a surface of an object to be inspected with light from a patterned light source;
a step of picking up an image of the object to be inspected;
a step of analyzing the image to extract a reflected image of the light source; and
a step of performing a good/defective judgment of the shape of the object to be inspected based on the result of comparing data regarding the extracted reflected image with data regarding the reflected image from a good product which is registered in advance.

Further, the present invention provides the method of inspecting a curved shape, comprising:
a step of irradiating a surface of an object to be inspected with light from a patterned light source;
a step of picking up an image of the object to be inspected;
a step of analyzing the image to extract a reflected image of the light source;
a step of calculating the position of the reflected image of the light source in a horizontal plane;
a step of comparing the calculated position with the position regarding a good product which is registered in advance; and
a step of performing a good/defective judgment of the shape of the object to be inspected based on the result of the comparison.

Further, the present invention provides the method of inspecting a curved shape, comprising:
a step of irradiating a surface of an object to be inspected with light from a pattered light source;
a step of picking up an image of the object to be inspected; and
a step of analyzing the image to extract a reflected image of the light source;
a step of calculating the position of the reflected image of the light source;
a step of calculating the gradient of the object to be inspected based on the position of the reflected image of the light source; and
a step of performing a good/defective judgment of the shape of the object to be inspected based on the result of comparing reference gradient data which is prepared in advance, with the obtained gradient of the surface of the object to be inspected.

Further, the present invention provides the method of inspecting a curved shape, comprising:
a step of irradiating a surface of an object to be inspected with light from a pattered light source;
a step of picking up an image of the object to be inspected;
a step of analyzing the image to extract a reflected image of the light source;
a step of calculating the position of the reflected image of the light source;
a step of calculating the height distribution of the surface of the object to be inspected based on the position of the reflected image of the light source; and
a step of performing a good/defective judgment of the shape of the object to be inspected based on the result of comparing reference height distribution data which is prepared in advance, with the calculated height distribution of the surface of the object to be inspected.

Further, as an embodiment of the method of inspecting a curved shape according to the present invention, it is preferred that the height distribution is a sum of the difference between adjacent reflected images along a predetermined axis direction.

Further, as an embodiment of the method of inspecting a curved shape according to the present invention, it is preferred that the object to be inspected is a curved glass sheet to be employed as a window glass of automobiles.

Further, the present invention provides an apparatus for inspecting a curved shape, comprising:

a light source for irradiating a surface of an object to be inspected with patterned light;

a camera for picking up an image of the object to be inspected; and a controller for analyzing the image to extract a reflected image of the light source and performing a good/defective judgment of the shape of the object to be inspected based on the result of comparing data regarding to the extracted reflected image with data regarding to the reflected image from a good product which is registered in advance.

Further, the present invention provides the apparatus for inspecting a curved shape, comprising:

a light source for irradiating a surface of an object to be inspected with patterned light;

a camera for picking up an image of the object to be inspected; and a controller for analyzing the image to extract a reflected image of the light source, calculating the position of the reflected image of the light source in a horizontal plane, comparing the calculated position with the position regarding a good product which is registered in advance, and performing a good/defective judgment of the shape of the object to be inspected based on the result.

Further, the present invention provides the apparatus for inspecting a curved shape, comprising:

a light source for irradiating a surface of an object to be inspected with patterned light;

a camera for picking up an image of the object to be inspected; and a controller for analyzing the image to extract a reflected image of the light source, calculating the position of the reflected image of the light source, calculating the gradient of the surface of the object to be inspected based on the position of the reflected image of the light source, and performing a good/defective judgment of the shape of the object to be inspected based on the result of comparing reference gradient data which is prepared in advance, with the calculated gradient of the surface of the object to be inspected.

Further, the present invention provides the apparatus for inspecting a curved shape, comprising:

a light source for irradiating a surface of an object to be inspected with patterned light;

a camera for picking up an image of the object to be inspected; and a controller for analyzing the image to extract a reflected image of the light source, calculating the position of the reflected image of the light source, calculating the height distribution of the surface of the object to be inspected based on the position of the reflected image of the light source, and performing a good/defective judgment of the shape of the object to be inspected based on the result of comparing reference height distribution data which is prepared in advance, with the calculated height distribution of the surface of the object to be inspected.

Further, as an embodiment of the apparatus for inspecting a curved shape according to the present invention, it is preferred that the height distribution is a sum of the difference between adjacent reflected images along a predetermined axis direction.

Further, as an embodiment of the apparatus for inspecting a curved shape according to the present invention, it is preferred that the object to be inspected is a curved glass sheet to be employed as a window glass of automobiles.

EXPLANATION OF NUMERALS

G: Glass sheet
1: Camera
2: Dot matrix light sources
3: Reflected image
3a: Original reflected image
4: Controller
5: Memory device

BEST MODE FOR CARRYING OUT THE INVENTION

Now, embodiments of the present invention will be described employing drawings.

Figures 1A, 1B:
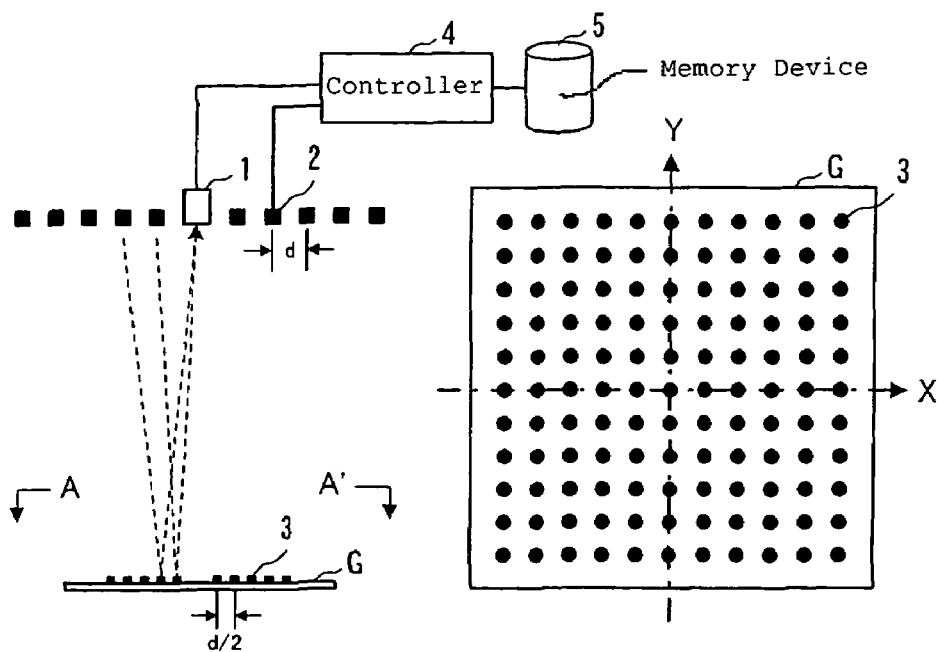
FIG. 1(a): A side view showing an embodiment of the inspection apparatus (for a flat glass sheet) according to the present invention.
FIG. 1(b): A view in the direction of an arrow A–A'.

FIG. 1(a) is a side view showing an embodiment of the inspection apparatus (for a flat glass sheet) according to the present invention, and FIG. 1(b) is a view in the direction of an arrow A–A'. A glass sheet G is placed on a conveyer or on a pallet. Above the glass sheet G, dot matrix light sources 2 comprising a plurality of dot light sources (such as LEDs, fluorescent tubes, or lamps) which are arranged in a matrix shape in a horizontal plane, and a camera 1 provided with a two-dimensional CCD (Charge Coupled Device), are fixed to a supporting frame, not shown. The distance between reflected images 3 on the surface of the glass sheet G is d/2 when the distance between dot light sources constituting the dot matrix light sources 2 is d.

Further, the controller 4 controls the camera 1 to pick up an image and controls to turn on or off the dot matrix light sources 2. Various control programs to be employed in the controller 4 and image data obtained by the image pick-up are registered in a memory device 5 which is connected to the controller 4. Here, instead of the dot matrix light sources, a light source having another pattern (for example, a grid shaped light source) may also be employed. Further, the dot matrix light sources 2 may be arranged on a ceiling having a dome-shape (whose cross-sectional shape is an arc shape) or a box shape. Further, the ceiling may be sloped from the center towards the periphery, or the shape of the ceiling may be flat in the central region and sloped toward the peripheral region. Further, the structure may be such that a dome-shaped or a box-shaped ceiling is provided with a large number of through holes so that light from a large sized light source (e.g. a fluorescent lamp) can be taken inside through these through holes.

Figures 2A, 2B:
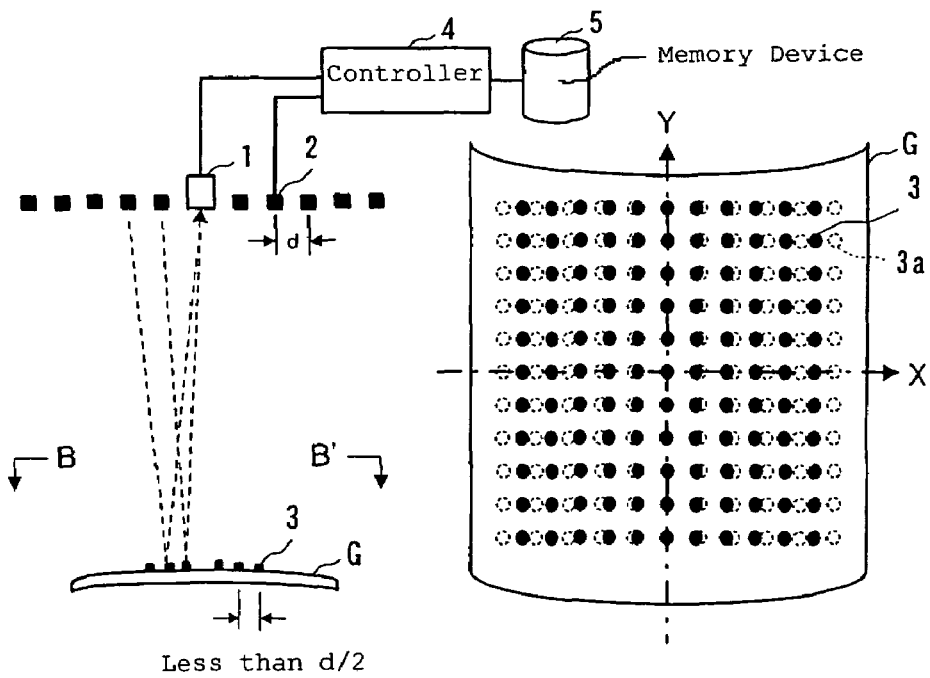
FIG. 2(a): A side view showing an embodiment of the inspection apparatus (for a curved glass sheet) according to the present invention.
FIG. 2(b): A view in the direction of an arrow B–B'.

FIG. 2(a) is a side view showing an embodiment of the inspection apparatus (for a curved glass sheet) according to the present invention, and FIG. 2(b) is a view in the direction of an arrow B–B'. The same numerals as in FIG. 1 designate the same constituents of that of FIG. 1. FIG. 2 is different from FIG. 1 in that the shape of the glass sheet G is curved. As shown in FIG. 2(a), in the case where the height of the dot matrix light sources 2 are adjusted in the same manner as the case of FIG. 1, and the glass sheet G is curved in an upward convex shape (here, curved only along X direction in this example), the distance between adjacent reflected images is less than d/2. Therefore, as shown in FIG. 2(b), an actual reflected image 3 is located closer to Y-axis than the original reflection image 3a on the glass sheet before it is curved.

Now, the procedure of the inspection method will be described.

Figure 3:
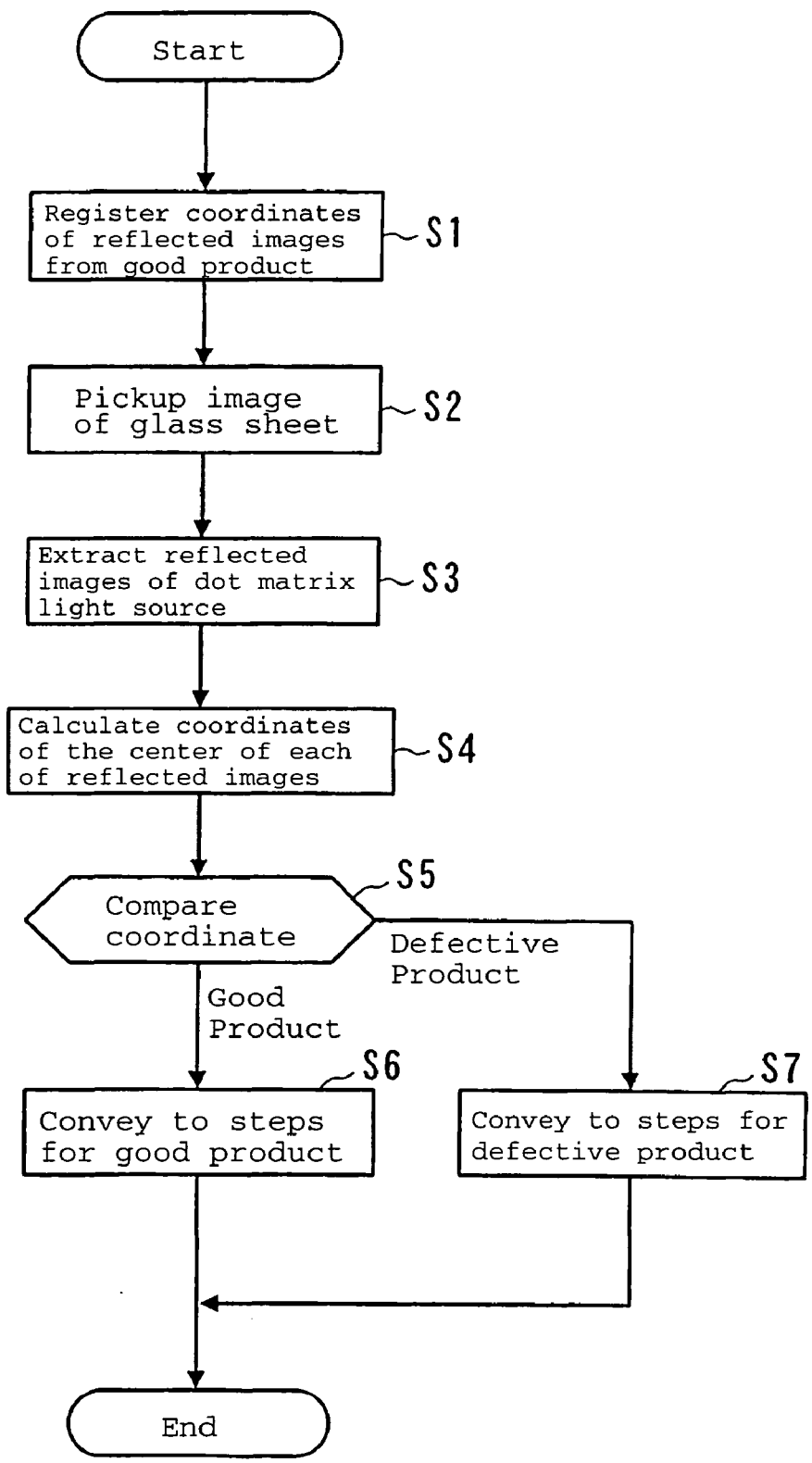
FIG. 3: A flow chart showing an embodiment of the inspection method according to the present invention.

FIG. 3 is a flow chart showing an embodiment of the inspection method according to the present invention. First, an image of a good product is picked up by employing a camera 1, and the coordinates of the reflected images of the dot matrix light sources 2 on a good product are registered in a database in a memory device 5 (step S1). Then, an image of a glass sheet G to be inspected is picked up (step S2), and the image is subjected to a image processing to extract from the image reflected images of the dot matrix light sources 2 (step S3).

Then, the coordinates of the gravity point of the reflected images (step S4), and the calculated coordinates are compared with the coordinates of the good product registered in the memory device 5 (step S5). As a result, if the differences from the coordinates of the good product are within a predetermined range, the glass sheet G inspected is judged as a good product, and if not, it is judged as a defective product. A glass sheet G judged as a good product is conveyed to subsequent processes for good product (step S6), and a defective product is conveyed to subsequent processes for defective product (step S7).

Next, another embodiment of the present invention will be described. In the above embodiment, the inspection is performed by comparing with coordinates of reflected images on a good product which are registered in advance. However, the inspection can also be performed based on calculation of the gradient of the surface of a glass sheet at positions of the reflected images. In this case, it is not necessary to pick up an image and register the data of good product in advance. Namely, good/defective can be judged by comparing with CAD (Computer Aided Design) data of the shape of the glass sheet. CAD data is a data based on a design specification, and a curved glass sheet is produced so as to coincide with the data as much as possible.

Figure 4A:
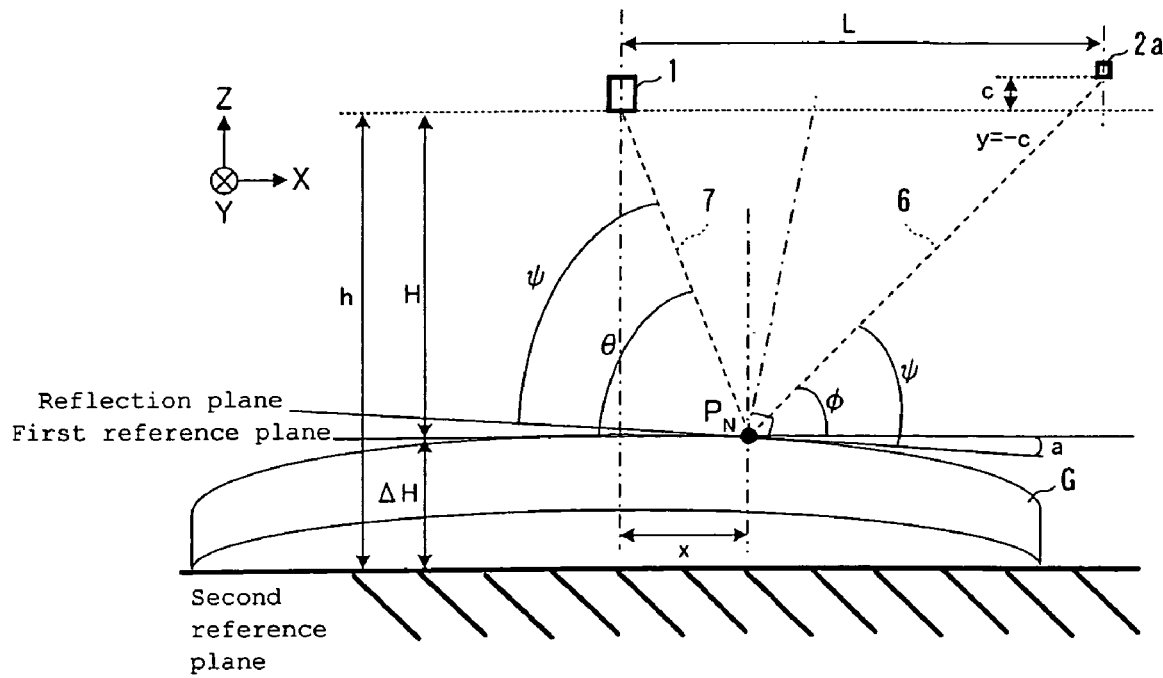
FIG. 4(a): A side view showing another embodiment of the inspection apparatus according to the present invention.
Figure 4B:
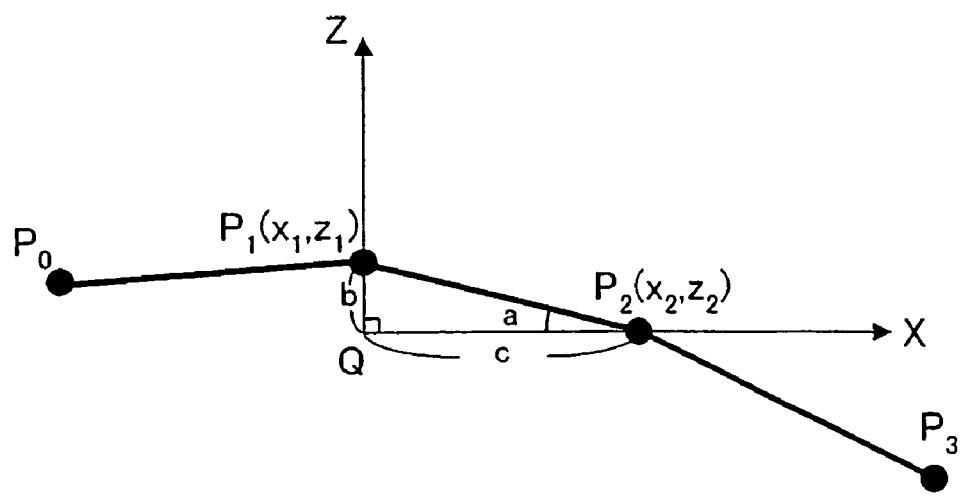
FIG. 4(b): A diagram explaining a calculation to obtain a distance H.

FIG. 4(a) is a side view showing another embodiment of the inspection apparatus according to the present invention, and FIG. 4(b) is a diagram explaining the calculation of a distance H from the camera to a first reference surface. A glass sheet G is a glass sheet curved in an upward convex shape shown in FIG. 2. A horizontal plane containing a measurement point (coordinates of gravity points of reflected images of dot matrix light sources 2a) $P_N$ on a surface of the glass sheet G is designated as a first reference plane, and a horizontal plane on which the glass sheet G is placed is designated as a second reference plane. A tangential plane tangent to the glass sheet G at a measurement point $P_N$ is designated as a reflection plane.

The distance from the camera 1 to the first reference plane is designated as H, the distance from the camera 1 to the second reference plane is designated as h, and the distance from the first reference plane to the second reference plane is designated as ΔH. The distance between the camera 1 and a dot light source 2a in a horizontal direction is designated as L, the distance between the camera 1 and the dot light source 2a in a vertical direction is designated as c, and the horizontal distance between the camera 1 and the measurement point $P_N$ is designated as X. The angle between the reflection plane and the first reference plane is designated as a.

Incident light 6 irradiated from the dot light source 2a, is regularly reflected by the reflection plane at the measurement point $P_N$ and reflected light 7 arrives at the camera 1. Here, the angle of the incident light 6 to the reflection plane is designated as ψ, and the angle of the incident light 6 to the first reference plane is designated as φ. Further, the angle of the reflected light 7 to the first reference plane is designated as θ. The angle of the reflected light 7 to the reflection plane is equal to ψ since the incident light 6 is regularly reflected as described above.

$$\theta = \tan^{-1}(H/x) \quad (1)$$

$$\phi = \theta - 2a \quad (2)$$

$$H - y = (L - x)\tan(\phi) \quad (3)$$

Therefore, from formulae (1) to (3), the following formula is constituted.

$$\tan^{-1}(H/x) - 2a = \tan^{-1}\{(H-y)/(L-x)\} \quad (4)$$

Accordingly, formula (4) can be modified to a formula (5), and an angle a can be obtained from the formula (5).

$$a = [\tan^{-1}(H/x) - \tan^{-1}\{(H-y)/(L-x)\}]/2 \quad (5)$$

When the glass sheet G is curved, it is necessary to recalculate it for every point since the distance from the camera 1 to the measurement point in Z direction changes depending on the measurement point. Here, if the coordinates of a point $P_1$ are known in advance, a distance b can be calculated from a gradient a at a point $P_2$ calculated in the above, using the following formula (6). And the coordinates of the adjacent point $P_2$ can be calculated as shown in a formula (7) (here, the distance b is an approximate value since the distance is assumed to be linearly changed between $P_1$ and $P_2$). Here, the point $P_1$ is preferably the gravity point (areal gravity point) of the glass sheet G. The distance H and ΔH at point $P_1$ are obtained by actual measurement (or by a calculation based on CAD data and the distance h (known)).

$$b = c \cdot \tan(a) \quad (6)$$

$$z_2 = z_1 - b, \quad x_2 = x_1 + c \quad (7)$$

Accordingly, good/defective judgment can be performed by calculating the gradient a in the X direction at measurement points, calculating the gradient in the Y direction in the same manner, comparing these measurement data with reference gradient data prepared in advance, and judging whether or not the difference from reference gradient data are within a predetermined range. The reference gradient data may be calculated by picking up an image of good product in advance and applying the above procedure. However, gradients at every measurement point can be obtained from CAD data of the glass sheet G.

Figure 5:
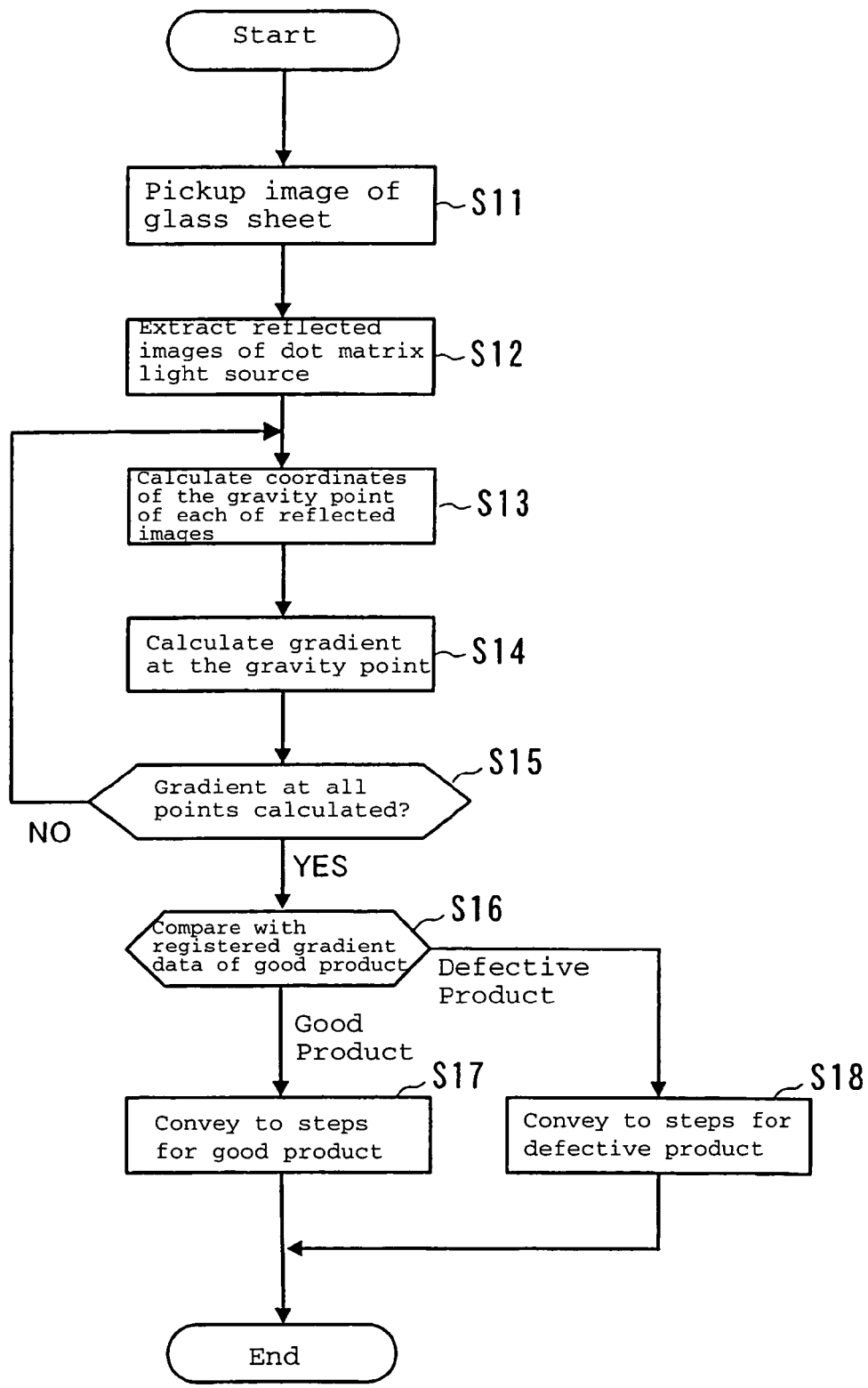
FIG. 5: A flow chart showing another embodiment of the inspection method according to the present invention.

FIG. 5 is a flow chart showing another embodiment of the inspection method according to the present invention. First, an image of glass sheet G is picked up (step S11). Then, reflected image of dot light source 2a is extracted in the same manner as the case of FIG. 1 (step S12), and the coordinates of the gravity point of each of the reflected images in XY plane are calculated (step S13). Then, by using the coordinates of the gravity point calculated and using the formula (5), gradients in X and Y directions at the gravity point are obtainable (step S14).

The steps S13 to S15 are repeated to calculate the gradients at all measurement points and then, operations move to the subsequent step (step S15). Then, the gradients thus calculated and the gradients of a good product registered are compared (step S16). If the differences between them are within a predetermined range, the product is judged as a good product, and if not, it is judged as a defective product (step S16). A good product is conveyed to subsequent steps for good product (step S17), and a defective product is conveyed to subsequent steps for defective product (step S18).

Figure 6:
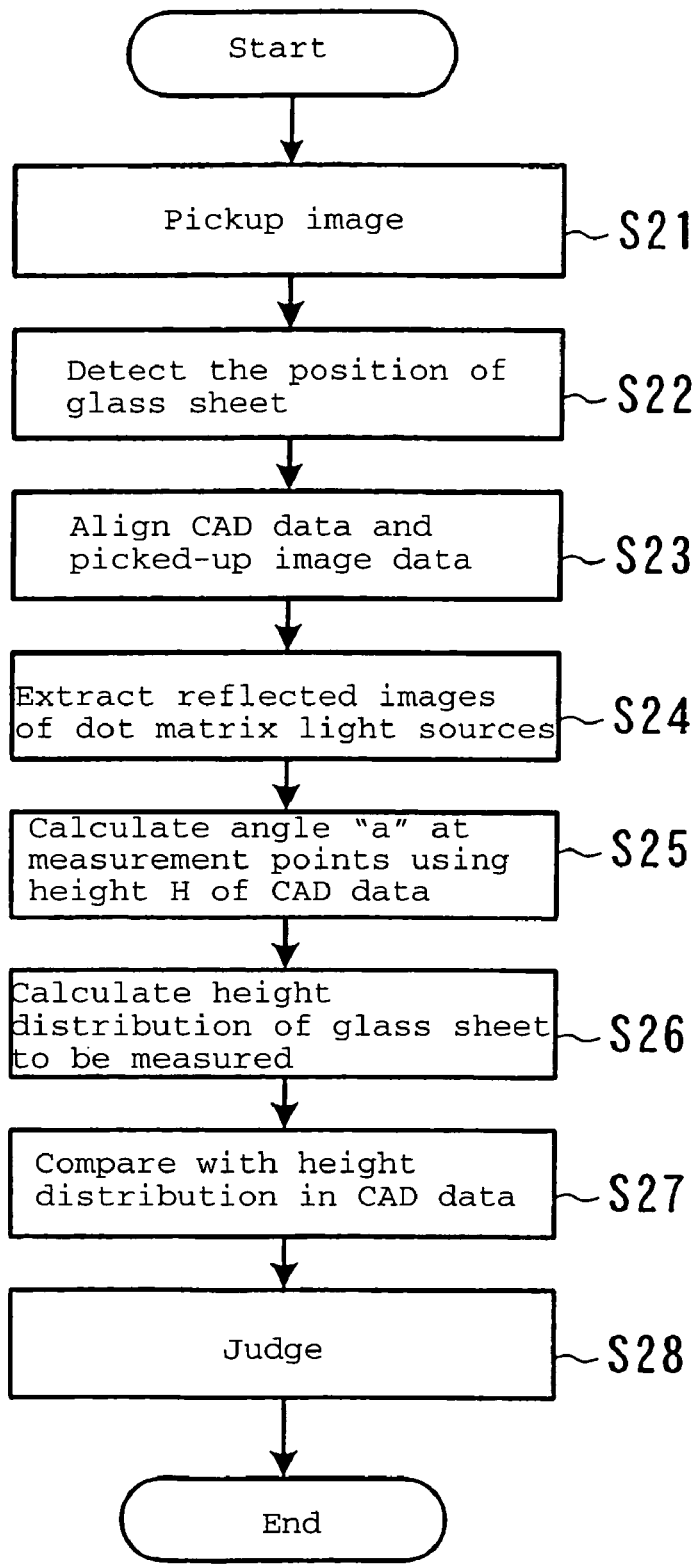
FIG. 6: A flow chart showing another embodiment of the inspection method according to the present invention.
Figure 7:
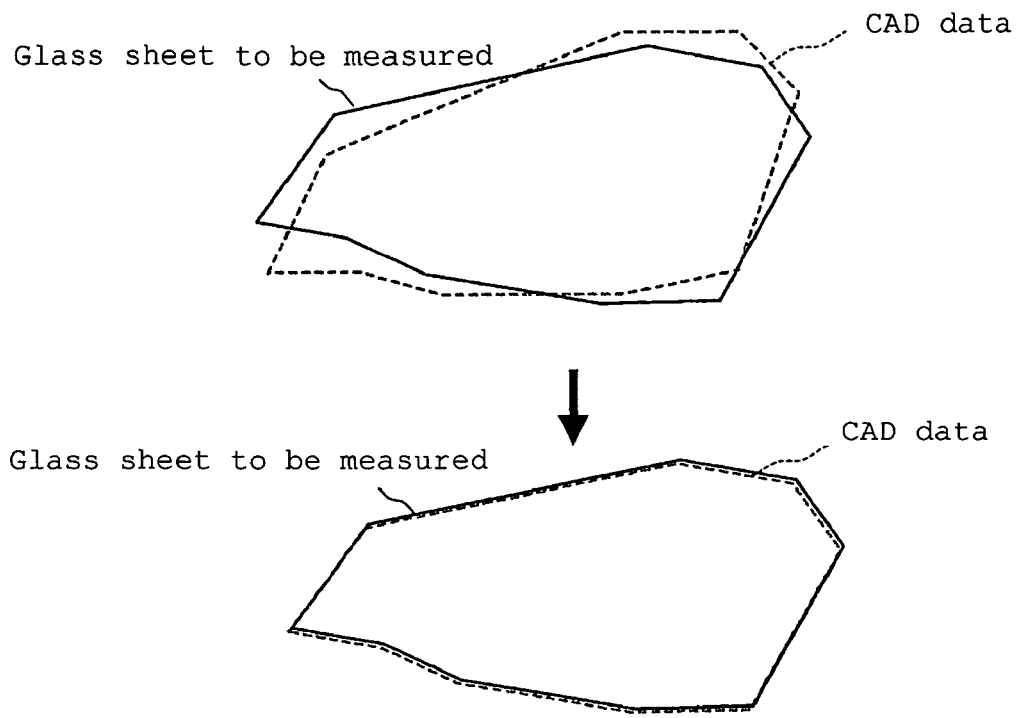
FIG. 7: A plan view explaining the step S23 in FIG. 6.

FIG. 6 is a flow chart showing another embodiment of the inspection method according to the present invention. In this flow, the height distribution of a surface of a glass sheet is obtained, and it is compared with the height distribution of CAD data to perform a good product/defective product judgment. At first, light from dot matrix light sources 2 is irradiated on the top surface of a glass sheet G, their reflected images are taken by a two-dimensional CCD camera 1 (step S21). Then, the controller 4 extracts the profile of the glass sheet G from the image (step S22), and the position of the image data is adjusted to align the profile to the profile of CAD data (step S23). Specifically, the image data of the glass sheet G to be measured is translated and rotated in horizontal and vertical directions to align the positions of the image data of the glass sheet G to be measured and the CAD data.

Then, from the image data of the glass sheet G to be measured, reflected images of the dot matrix light sources 2 appeared on the image data are extracted (step S24). The center of each of the reflected images are set as measurement points, and the gradient (angle a) in X and Y directions at the measurement points are calculated by using formulae (1) to (5) (step S25). Then, using the height H at the gravity point of the CAD data and an angle a at the measurement points calculated in the above, the height H at the measurement points are calculated. Then, the difference (designated as a numeral b in FIG. 4(b) of the heights H of adjacent measurement points are obtained one after another, and all the differences are summed up along X or Y direction (step S26).

Figure 8:
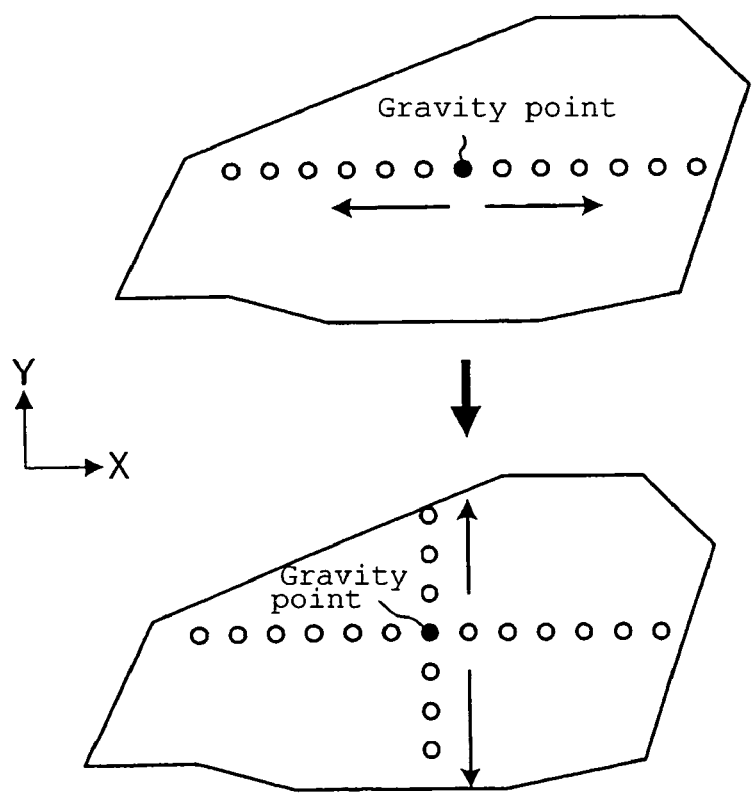
FIG. 8: A plan view explaining the step S26 in FIG. 6.
Figure 9:
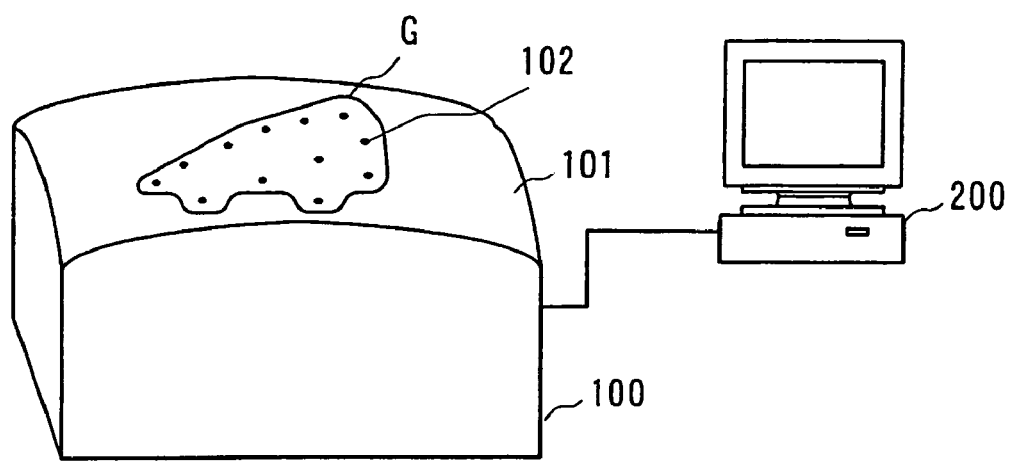
FIG. 9: A perspective view schematically showing a conventional inspection apparatus.

For example in FIG. 8, starting from the gravity point, the differences of the heights H of adjacent measurement points in X direction are obtained, and they are summed up to obtain an "integrated value in X direction". Thereafter, starting from the gravity point, the differences of the heights H of adjacent measurement points in Y direction are obtained in the same manner, and they are summed up to obtain an "integration value in Y" direction. The same procedure is performed with respect to all of the measurement points.

Then, the integrated values in X and Y directions obtained at every measurement points are compared with integrated values (reference height distribution data in the claims) in X and Y directions of CAD data which are obtained in advance (step S27), and a judgment of good product/defective product is performed based on the result (step S28). Namely, if the displacement values are within a predetermined range, the product is judged as a good product. If the displacement value exceeds the predetermined range at at least one point, the product is judged as a defective product. The criteria to judge the good product/defective product is determined according to e.g. the shape of the glass sheet and request of users of the product.

INDUSTRIAL APPLICABILITY

As described above, according to the present invention, the good/defective judgment of the shape of an object to be measured is based on the position of a reflected image of a light source on the surface of the product to be measured. Therefore, it is not necessary to prepare a dedicated inspection apparatus for each model of the object to be measured, and the inspection can be performed by an image processing, and accordingly, the inspection procedure is more simple than conventional procedures. Further, according to the present invention, since the shape of the object to be measured which is conveyed by a conveyer, can be inspected without stopping the conveyance of the object to be measured, the productivity can be improved as compared with conventional methods.

Here, the present invention can be employed for inspecting the shape of not only a glass sheet for automobiles but only for a glass sheet for other vehicles, trains, ships, airplanes and architectural structures. Further, the present invention can be applied to a shape inspection of a curved transparent resin plate or a mirror surface object (e.g. a metallic plate or a resin plate).

The entire disclosure of Japanese Patent Application No. 2002-224858 filed on Aug. 1, 2002 including specification, claims, drawings and summary is incorporated herein by reference in its entirety.

What is claimed is:

1. A method of inspecting a curved shape, comprising:
a step of irradiating a surface of an object to be inspected with light from a pattered light source;
a step of picking up an image of the object to be inspected;
a step of analyzing the image to extract a reflected image of the light source;
a step of calculating the position of the reflected image of the light source;
a step of calculating the height distribution of the surface of the object to be inspected based on the position of the reflected image of the light source; and
a step of performing a good/defective judgment of the shape of the object to be inspected based on the result of comparing data regarding the extracted reflected image with data regarding the reflected image from a good product which is registered in advance,
wherein the step of performing the good/defective judgment of the shape of the object to be inspected is based on the result of comparing reference height distribution data which is prepared in advance, with the calculated height distribution of the surface of the object to be inspected, and wherein the height distribution is a sum of the difference between adjacent reflected images along a predetermined axis direction.

2. An apparatus for inspecting a curved shape, comprising:

a light source for irradiating a surface of an object to be inspected with patterned light;

a camera for picking up an image of the object to be inspected; and a controller for analyzing the image to extract a reflected image of the light source and performing a good/defective judgment of the shape of the object to be inspected based on the result of comparing data regarding to the extracted reflected image with data regarding to the reflected image from a good product which is registered in advance, wherein the controller is for calculating the position of the reflected image of the light source, calculating the height distribution of the surface of the object to be inspected based on the position of the reflected image of the light source, and performing the good/defective judgment of the shape of the object to be inspected based on the result of comparing reference height distribution data which is prepared in advance, with the calculated height distribution of the surface of the object to be inspected, and wherein the height distribution is a sum of the difference between adjacent reflected images along a predetermined axis direction.

3. The method of inspecting a curved shape according to claim 1, wherein the object to be inspected is a curved glass sheet.

4. The method of inspecting a curved shape according to claim 1, wherein the object to be inspected is a curved transparent resin sheet.

5. The method of inspecting a curved shape according to claim 1, wherein the object to be inspected is a curved mirror surface object.

6. The method of inspecting a curved shape according to claim 1, wherein the object to be inspected is a curved glass sheet to be employed as a window glass for automobiles.

7. The method of inspecting a curved shape according to claim 1, wherein the light source includes a plurality of dot light sources.

8. The method of inspecting a curved shape according to claim 7, wherein the light source is an LED.

9. The method of inspecting a curved shape according to claim 7, wherein the light source is a fluorescent tube.

10. The method of inspecting a curved shape according to claim 7, wherein the light source is a lamp.

11. The apparatus for inspecting a curved shape according to claim 2, wherein the object to be inspected is a curved glass sheet.

12. The apparatus for inspecting a curved shape according to claim 2, wherein the object to be inspected is a curved transparent resin sheet.

13. The apparatus for inspecting a curved shape according to claim 2, wherein the object to be inspected is a curved mirror surface object.

14. The apparatus for inspecting a curved shape according to claim 2, wherein the object to be inspected is a curved glass sheet to be employed as a window glass for automobiles.

15. The apparatus for inspecting a curved shape according to claim 2, wherein the light source includes a plurality of dot light sources.

16. The apparatus for inspecting a curved shape according to claim 15, wherein the light source is an LED.

17. The apparatus for inspecting a curved shape according to claim 15, wherein the light source is a fluorescent tube.

18. The apparatus for inspecting a curved shape according to claim 15, wherein the light source is a lamp.

* * * * *